Patented Dec. 22, 1942

2,305,622

UNITED STATES PATENT OFFICE 2,305,622

FLAVORED FOODS

Roland E. Kremers, Summit, N. J., assignor to General Foods Corporation, New York, N. Y., a corporation of Delaware No Drawing. Application August 3, 1939, Serial No. 288,229

11 Claims. (Cl. 99—140)

This invention pertains to the preservation of aromatic or flavor compounds, particularly in food products, so as to protect such products against loss or deterioration of flavor or aroma during the period between manufacture and actual use thereof, and is a continuation in part of my application Serial No. 136,667, filed April 13, 1937.

It is well known that the aroma and flavor of many articles of food are their most valued characteristics and are essential to their successful merchandising. This importance has led to the concentration and study of aroma and flavor bearing substances, the concentrated flavor and aroma bearing volatile oils of fruits or other food materials being manifest products of such efforts. With the concentration of aromas and flavors it has been possible to add attractive and appealing characteristics to otherwise odorless or flavorless materials.

With the advent of goods in package form, many articles were reduced to a sensibly dry condition for convenience and stability during merchandising, and the above mentioned aroma and flavor concentrates have been incorporated into such dry products in various ways known to the art and often by the simple expedient of thorough mixing. Unfortunately such products often deteriorate rapidly during their "shelf-life" and lose their appeal because of the instability of the flavor and aroma bearing chemical constituents in spite of the greatest care in the design, materials and sealing of the packages. To overcome this difficulty it has sometimes been proposed to add synthetic substances which have a more powerful aroma or flavor, such addition of synthetics being commonly referred to as a "fortification" of the weaker natural flavors and aromas. Although the strength of such synthetic chemicals is often very great, they do not have, except in special instances, markedly greater resistance to deterioration than the natural concentrates. What they add in intensity is often offset by their very great volatility.

It is well known that these flavor and aroma losses even of fortified products have led to many efforts to prevent such losses by mechanical means. For instance, efforts have been made to occlude the flavors in agglomerations or granules of bulkier ingredients of the mixtures, or to retard evaporation by dissolving the flavor in high boiling substances. However, all such attempts have at best only slightly retarded the loss of flavor and aroma. It is characteristic of all these previous efforts to preserve flavor and aroma that an aggregate of flavor bearing materials has been subjected as an entirety to the same mechanical or physical manipulation without regard to the stability or instability of the individual constituents of the aggregate. Hermetical sealing of materials in the absence of atmospheric oxygen accomplishes the desired end for some commodities, but it introduces an unwarranted manufacturing cost and provides no protection after the seal has once been broken.

In contrast to this prior art, it is a characteristic of the present invention that the preservation of flavor and aroma of food products of the type described above is accomplished through chemical manipulations based on and adapted to the specific reactivities of individual chemical constituents of the flavor and aroma bearing volatile oils.

The aroma and flavor bearing substances of fruits and other food materials are found principally in the volatile oils and investigation and study of these oils have shown that the most important flavor and aroma bearing constituents of these oils are aldehydes, alcohols, ketones, esters, phenols, and lactones. Broadly speaking the deterioration of flavor and aroma in food products containing added volatile oils is due to changes in these constituents caused by two general processes. The first process is that of volatilization, whereby the flavor or aroma bearing substances evaporate more or less rapidly due to their measurable vapor pressure. The second process is that of oxidation. Such substances may be unstable to atmospheric oxygen in a variety of ways. They may be oxidized to other compounds, or they may undergo resinification or polymerization as a result of the more or less catalytic effect of lesser quantities of oxygen. An accessory factor which tends to accelerate these deteriorating effects of evaporation and oxidation is the common practice of spreading the added volatile oil over the surface of the dry ingredients which constitute the bulk of the food. The rate of flavor loss is a more or less individual characteristic of each volatile oil constituent. In an acidulated gelatin dessert powder, for example, the flavor and aroma of benzaldehyde and citral vanish or deteriorate materially in two weeks or less, whereas certain other constituents such as decanal are more persistent. Nevertheless in virtually every case a distinct change of aroma or flavor occurs, leading to a deteriorated product. Protection both against evaporation and against atmospheric oxygen is therefore essential to overcome the deterioration and to avoid the wasteful and uneconomical practice of adding excessive quantities of flavor materials to allow for loss.

One of the objects of the present invention is to prevent deterioration of the aroma and flavor of food products of the type characterized above by utilizing the chemical affinities of the aroma and flavor bearing substances to form compounds of sufficient stability against volatilization and oxidation substantially to withstand change during the shelf-life of the product, both in the store and in the home, but of such nature as to release the desired aroma or flavor during the preparation or use of the product.

Another object is to provide a method of imparting flavor or aroma to a food product wherein flavor or aroma is released or regenerated in nascent state from chemical combination with another substance during the preparation of the food for consumption.

Another object is to provide a packaged food product having improved flavor and aroma characteristics at the time of use or consumption due to the prevention of deterioration and the release of fresh flavor therein.

A further object is to provide a food product containing an aroma or flavor bearing substance chemically combined with an edible but substantially odorless and tasteless substance to form a reaction product that is substantially unaffected by oxidation and substantially non-volatile so that said product can be packaged and stored in ordinary paper or other suitable packages without material deterioration of aroma or flavor.

Another object is to prevent the evaporation or oxidation of individual constituents of volatile oils added to food products of the type characterized above by the prior conversion of such constituents into definite, preferably solid chemical derivatives.

A still further object is to minimize change in the added reaction products during storage by using preferably solid derivatives whereby contact with other ingredients and exposure to atmospheric conditions is greatly reduced.

To the above ends one or more aroma or flavor bearing substances that are desired for a given food product, and particularly those chemical constituents which are characteristically present in natural volatile oils having the desired flavor and aroma, are first chemically combined with suitable reagents to form reaction products that are stable, substantially non-volatile, and substantially non-oxidizable as compared with the uncombined substances. Such reaction products are therefore vehicles whereby flavor and aroma bearing substances can be added to food products which can then be kept or stored substantially indefinitely, or packaged in ordinary paper or other suitable cartons and kept on the shelf without material change in or loss of said substances for periods that are relatively long as compared with similar products as now marketed. If then the reaction product is such that the conditions of preparation or use of the food bring about the breaking up or decomposition of the reaction product, the original flavor or aroma bearing substance may be liberated or regenerated in the food without having undergone deterioration during the period between manufacture and use.

The flavor and aroma bearing constituents of the natural volatile oils can be classified on a functional basis in terms of their characteristic atomic or functional groups, such as the hydroxyl (—OH) group in the case of the alcohols and phenols, the carbonyl (C=O) group in the case of aldehydes and ketones, etc. A reaction which involves a functional group of a compound and does not otherwise alter its molecular structure is a functional reaction and the resultant reaction product is a functional derivative of the original compound. Because functional derivatives can often be resolved into the original reactants by reversing the reaction which united them, such derivatives are a preferred type of reaction product for purposes of the present invention.

Further with particular substances it is possible to employ any one of a number of suitable reagents provided the reaction products are stable against deterioration and have no deleterious effect on the flavor and aroma bearing substances or on the food products. Since as indicated above any change in the chemical make-up of the flavor or aroma bearing substances may lead to an undesirable change or loss of flavor and aroma, the chemical reaction is preferably such that under the conditions of preparation or use the original aroma or flavor bearing substance may be liberated or made available in its original and unchanged form. Further the reagents used should be acceptable as ingredients of foodstuffs whenever the product is intended for human consumption, and should be compatible with the food in the sense that they do not of themselves contribute any objectionable aroma or flavor; if they are not odorless or tasteless they should have characteristics which are desirable or at least not objectionable in the food in which they are used. The term "compatible" will be understood to have this meaning throughout this specification and the appended claims.

The reaction product must also be unstable under the conditions of ultimate preparation or use of the food. The factors which may bring about the regeneration of the original aroma and flavor bearing substance will vary according to the manner of preparing or using the food and include: the mass action of water; the catalytic effect of acids, for instance fruit acids; the conditions obtaining in the mouth; elevated temperatures, for instance the temperature of hot or boiling water; or other operations employed in the preparation, consumption, or use of the food. Any reagent may be employed which complies with the foregoing requirements and provides a reaction product that is substantially non-volatile, as compared with the original substance, and substantially stable to the ordinary conditions of temperature and atmosphere encountered in the marketing of the particular food in which it is incorporated. Accordingly the normal composition, the normal storage conditions and the normal methods of preparation of any given food product of the type concerned constitute conditions which determine the degree of stability and reversibility demanded of each chemical derivative of a volatile oil constituent to be added to said food product and are in effect the specifications of the requisite properties of these chemical derivatives.

The invention is applicable to a wide variety of food products such as cereals, dessert preparations, jelly mixtures, beverage substances and extracts, chicle, etc. The well-known flavored and sweetened dessert mixtures, for example, gelatin desserts, pudding powders, ice cream mixes, etc., furnish convenient illustrations of the application of the invention. Hermetical sealing of such mixtures is not economically practicable and they are commonly packaged in paper containers which may remain on the shelf for substantial periods before they are sold and for further substantial periods in the home before they are actually used. The volatile and oxidizable constituents of the natural volatile oils found in concentrated flavoring extracts derived from fruits and other foods deteriorate rapidly under these conditions. By adding a flavor bearing substance combined with a reagent as specified above, so that the flavor bearing substance does not deteriorate, it is possible to regenerate or release the flavor in its original form and intensity when the dessert is prepared for consumption. In effect fresh flavor is added at the time of preparation or use regardless of the time that has elapsed since the manufacture of the product.

Under the functional classification referred to above, chemical constituents of volatile oils characterized by a carbonyl or hydroxyl group form two important classes of flavor and aroma bearing compounds. Functional derivatives of compounds of these classes can be formed according to the invention by various reactions, among which may be mentioned reactions with direct or indirect elimination of water involving carbonyl and amine groups, carbonyl and hydroxyl groups, and hydroxyl and carboxyl groups, depending on the functional group present in the particular flavor and aroma bearing constituent involved.

The following illustrations exemplify functional derivatives involving hydroxyl and carboxyl groups. As will be seen from these examples, the flavor and aroma bearing constituent may provide either of the functional groups involved in the reactions, or both reactants may be flavor and aroma bearing, in which case they both will be protected and both will be regenerated. It further will be evident that whichever group is provided by the flavor and aroma bearing constituent, the reactant supplying the other group may be selected from a wide variety of substances.

*Phenylethyl-gluconate M. P. 104–106° C.*—This substance is prepared by mixing 2 grams of glucono-lactone with 10 cc. of phenylethyl alcohol and introducing a small amount of dry hydrogen chloride. The mixture is heated until the lactone is completely dissolved, and after crystallization excess liquid is removed by pressing the product on a porous plate and by prolonged contact with ether. It regenerates phenylethyl alcohol slowly in acidulated gelatin desserts.

*Terpinyl - potassium - carbonate.*—Potassium terpineolate is prepared in the usual manner and at the end of the reaction the liquid is decanted from the excess metal and diluted with 1 part of dry toluene and 2 parts of dry ether. Dry carbon dioxide gas is then bubbled through the mixture until precipitation of the carbonate is complete, after which the product is collected on a filter, washed with ether, and dried in a vacuum. It regenerates a good terpineol flavor and aroma in acidulated gelatin desserts and is useful with distilled lime oil flavors.

*Menthyl-potassium-carbonate.*—This product is prepared by the technic described for the preceding compound and is useful in producing a minty flavor or cooling sensation.

*Acetylanhydrocitric acid M. P. 125–127° C.*—This compound is prepared by the reaction of acetylchloride on dry citric acid and may be purified conveniently by recrystallization from dichlorethane. It, as well as its derivatives, acetyl- citric acid and trisodium acetylcitrate, are useful in small quantities for imparting a tart note to certain fruit flavors.

*Propionylanhydrocitric acid M. P. 134–138° C.*—This product is prepared like the preceding compound, with the substitution of propionylchloride for acetylchloride, and its uses, as well as those of its corresponding derivatives are analogous.

*Caproylanhydrocitric acid M. P. 75–78° C.*—This product results from the reaction of caproylchloride on citric acid. If necessary, crystallization may be induced by washing with hexane. It is useful in applications similar to those described in connection with the two preceding compounds.

It will be understood that it is not essential to isolate the desired volatile oil constituents in pure form in order to produce functional derivatives thereof in accordance with the present invention, since in certain cases the same reactions and the same derivatives will be obtained regardless of whether an individual constituent is treated in isolated form or in the presence of other constituents of the volatile oil in which it occurs. It hence will be understood that the references herein and in the appended claims to the treatment of individual chemical constituents of volatile oils include the formation of reaction products not only by treatment of isolated constituents but also by selective reaction upon such constituents in the presence of other constituents of the oils containing them.

It further will be apparent from the foregoing description that the invention is applicable to a wide variety of aroma and flavor bearing constituents of volatile oils. While the specific reagents may vary with different constituents to be stabilized and with the food to be flavored, the reactions have in common the formation of a functional derivative of the flavor and aroma bearing constituent that is substantially non-volatile and non-oxidizable under conditions attending the marketing of the product, and which is dissociated under the conditions of ultimate use of the product. Thereby the flavor and aroma of the stabilized materials are imparted to the food in a nascent state with full freshness and intensity, at the instant of preparation or use and substantially regardless of the elapsed time since manufacture of the food. Not only is deterioration prevented and a full fresh flavor obtained, but also the invention makes unnecessary the use of excessive quantities of flavor materials heretofore sometimes added to allow for loss. Further since volatilization and oxidation cease to be a factor, cheaper packages may be used and less care in sealing required.

The foregoing illustrations are by way of example only and are not to be understood to comprise the limits of the invention. Other reagents and other stabilizing reactions will be apparent to those skilled in the art, in the cases both of the flavor and aroma bearing substances expressly referred to herein as well as others. Furthermore some variation in the reagents used is to be expected depending on the nature of the food to which the flavor is to be added. Thus a reagent, when regenerated, may have a taste which would be acceptable in one food but not in another. Also in a non-acid product, for example, the reaction should be such as to be reversible in the absence of acid. Moreover, in some cases a stable reaction product may be formed from two flavor bearing substances both of which are desirable in the product to be flavored, in which case the use of additional reagents may be avoided. These considerations which control the selection of the most suitable reagent for a particular flavor or aroma and food will readily be understood by those skilled in the art, in view of the above discussion of the principles involved. It will also be understood that any one or a plurality of these reaction products may be added to the same food, either comprising the entire flavor and aroma or a portion thereof or being used as a fortification of the natural flavor and aroma bearing substances. These various embodiments will be within the knowledge of those skilled in the art without departing from the spirit of the invention and reference should be had to the appended claims to determine its limits.

Although this invention is described in terms of constituents of the natural volatile oils and although it is practiced preferably by using natural materials, there is obviously little, if any, chemical difference in a given compound due to its origin, i. e., whether natural or artificial. Therefore, it is regarded as within the present invention to substitute an artificial flavor or aroma bearing compound for one of natural origin or to extend a given reaction to other compounds of the same class when the difference involved is essentially a question of the natural occurrence or artificial production of the aromatic compound to be protected.

Certain of the reactions and processes of preparation that are described above embody per se features of novelty that will be claimed in separate applications and hence are not claimed specifically herein.

What is claimed is:

1. A process of imparting flavor and aroma to a food product at the time of use which comprises adding thereto during its manufacture a stable, substantially non-volatile, non-oxidizable functional derivative formed by chemical interaction of a hydroxyl group of one reactant and a carboxyl group of another reactant, said reactants being compatible with the food and at least one being a flavor and aroma bearing volatile oil constituent, the chemical reaction between said groups being reversible under conditions of ultimate use of the food to liberate said two reactants.

2. The method of imparting flavor to a food product which comprises adding thereto a stable, substantially non-volatile and non-oxidizable functional derivative of a flavor or aroma bearing constituent of a volatile oil having a hydroxyl group and a reagent compatible with the food and having a carboxyl group, said derivative being hydrolyzed under conditions of ultimate use of the food to liberate said constituent.

3. The method of imparting flavor to a food product which comprises adding thereto a stable, substantially non-volatile and non-oxidizable functional derivative of a flavor or aroma bearing constituent of a volatile oil having a carboxyl group and a reagent compatible with the food and having a hydroxyl group, said derivative being hydrolyzed under conditions of ultimate use of the food to liberate said constituent.

4. The method of imparting flavor to a food product which comprises adding thereto a chemical compound which decomposes under conditions of ultimate use of the food to liberate said flavor, said compound being formed by the elimination of water by the interreaction of a —COOH group and an —OH group where one of said groups is provided by a flavor or aroma bearing constituent of a volatile oil and the complementary group is provided by an edible organic hydroxy acid compatible with the flavor and aroma of the food and forming with said constituent a stable, substantially non-volatile, non-oxidizable compound.

5. A method of imparting flavor to a food product which comprises adding thereto a stable, substantially non-volatile, non-oxidizable compound which decomposes under conditions of ultimate use of the food to liberate said flavor, said compound being a salt of a half ester of carbonic acid that is compatible with the flavor and aroma of the food with an alcohol which is a flavor and aroma bearing constituent of a volatile oil.

6. A method of imparting flavor to a food product which comprises adding thereto a stable, substantially non-volatile, non-oxidizable compound which decomposes under conditions of ultimate use of the food to yield said flavor, said compound being phenylethyl gluconate.

7. A method of imparting flavor to a food product which comprises adding thereto a stable, substantially non-volatile, non-oxidizable compound which decomposes under conditions of ultimate use of the food to yield said flavor, said compound being an acyl ester of a hydroxy organic acid, the esterifying acid being a flavor and aroma bearing constituent of a volatile oil and the hydroxy organic acid being a fruit acid.

8. A method of imparting flavor to a food product which comprises adding thereto a stable, substantially non-volatile, non-oxidizable compound which decomposes under conditions of ultimate use of the food to yield said flavor, said compound being caproylanhydrocitric acid.

9. A foodstuff having at the time of consumption the characteristic flavor and aroma of a constituent of a volatile oil, said flavor and aroma being embodied in a stable, substantially non-volatile, non-oxidizable functional derivative formed by the chemical interaction of a hydroxyl group of one reactant with a carboxyl group of another reactant, one of said reactants comprising said constituent and the other being compatible with said flavor and aroma, said reaction being reversible under conditions of ultimate use to liberate said two reactants.

10. A foodstuff having at the time of consumption the characteristic flavor and aroma of a constituent of a volatile oil, said flavor and aroma being embodied in a stable, substantially non-volatile, non-oxidizable functional derivative formed by the chemical interaction of the hydroxyl group of said constituent with a carboxyl group of a reactant compatible with said flavor and aroma, which derivative is hydrolyzable under conditions of ultimate use to liberate said constituent.

11. A foodstuff having at the time of consumption the characteristic flavor and aroma of a constituent of a volatile oil, said flavor and aroma being embodied in a stable, substantially non-volatile, non-oxidizable functional derivative formed by the chemical interaction of the carboxyl group of said constituent with a hydroxyl group of a reactant compatible with said flavor and aroma, which derivative is hydrolyzable under conditions of ultimate use to liberate said constituent.

ROLAND E. KREMERS.